(12) United States Patent
Field et al.

(10) Patent No.: US 11,635,186 B2
(45) Date of Patent: Apr. 25, 2023

(54) POLYMERIC SUBSTRATE AND A METHOD OF PROVIDING SAME

(71) Applicant: MOTHERSON INNOVATIONS COMPANY LIMITED, London (GB)

(72) Inventors: Simon David Field, Lonsdale (AU); Sascha Björn Heib, Lonsdale (AU); Andreas Herrmann, Stuttgart (DE); Oliver Hochart, Harnes (FR); Serge Grdemyan, Harnes (FR)

(73) Assignee: Motherson Innovations Company Limited, London (GB)

( * ) Notice: Subject to any disclaimer, the term of this patent is extended or adjusted under 35 U.S.C. 154(b) by 522 days.

(21) Appl. No.: 16/722,194

(22) Filed: Dec. 20, 2019

(65) Prior Publication Data

US 2020/0124246 A1   Apr. 23, 2020

Related U.S. Application Data

(63) Continuation-in-part of application No. 16/439,674, filed on Jun. 12, 2019, now Pat. No. 10,563,838, (Continued)

(51) Int. Cl.
  *B05D 1/18* (2006.01)
  *F21S 43/31* (2018.01)
  (Continued)

(52) U.S. Cl.
  CPC ............... *F21S 43/31* (2018.01); *B05D 1/18* (2013.01); *B05D 1/26* (2013.01); *B05D 3/06* (2013.01);
  (Continued)

(58) Field of Classification Search
  None
  See application file for complete search history.

(56) References Cited

U.S. PATENT DOCUMENTS 9,176,256 B2   11/2015   Hall et al.
9,181,616 B2   11/2015   Evans et al.
(Continued)

FOREIGN PATENT DOCUMENTS

DE   3843522 A1   7/1990
EP   0756131 A1   1/1997
(Continued)

OTHER PUBLICATIONS

Extended European Search Report dated Oct. 22, 2020 of European application No. 20167751.5-1012.

*Primary Examiner* — Shamim Ahmed
*Assistant Examiner* — Bradford M Gates
(74) *Attorney, Agent, or Firm* — Jones Day

(57) ABSTRACT

A polymeric substrate and a method of providing same includes providing a protection system of one or more layers on at least one first surface of the polymeric substrate, coating a spectrally controlling system on a surface of the protection system to provide an external surface, the spectrally controlling system comprising at least a light absorbing or a light reflecting layer, partially removing the spectrally controlling system from the external surface until reaching the at least one first surface of the protection system creating in the spectrally controlling system an area free of the light absorbing or light reflecting layer of the spectrally controlling system, and covering the area by depositing at least one or more substances in droplets.

15 Claims, 4 Drawing Sheets

Related U.S. Application Data which is a continuation of application No. 16/378,533, filed on Apr. 8, 2019, now Pat. No. 10,443,808, which is a continuation of application No. 16/378,553, filed on Apr. 8, 2019, now Pat. No. 10,443,807.

(60) Provisional application No. 62/642,010, filed on Mar. 13, 2018.

(51) Int. Cl.

| | | |
|---|---|---|
| *B60Q 1/26* | (2006.01) | |
| *F21S 41/20* | (2018.01) | |
| *F21S 41/36* | (2018.01) | |
| *B60Q 1/34* | (2006.01) | |
| *B60Q 1/30* | (2006.01) | |
| *B60Q 1/04* | (2006.01) | |
| *F21S 43/20* | (2018.01) | |
| *B05D 1/26* | (2006.01) | |
| *B05D 5/06* | (2006.01) | |
| *B05D 3/06* | (2006.01) | |
| *B44C 1/22* | (2006.01) | |
| *B44C 3/10* | (2006.01) | |
| *B44C 3/00* | (2006.01) | |
| *B44C 5/04* | (2006.01) | |
| *B44F 1/06* | (2006.01) | |
| *C08J 7/04* | (2020.01) | |

(52) U.S. Cl.
CPC .............. *B05D 5/06* (2013.01); *B44C 1/228* (2013.01); *B44C 3/005* (2013.01); *B44C 3/10* (2013.01); *B44C 5/04* (2013.01); *B44F 1/066* (2013.01); *B60Q 1/0408* (2013.01); *B60Q 1/2619* (2013.01); *B60Q 1/2696* (2013.01); *B60Q 1/30* (2013.01); *B60Q 1/34* (2013.01); *C08J 7/0423* (2020.01); *F21S 41/285* (2018.01); *F21S 41/36* (2018.01); *F21S 43/26* (2018.01); *B05D 2201/02* (2013.01); *B60Q 2400/20* (2013.01); *B60Q 2400/30* (2013.01); *Y10T 428/195* (2015.01)

(56) References Cited

U.S. PATENT DOCUMENTS

| | | |
|---|---|---|
| 9,656,601 B2 | 5/2017 | Evans et al. |
| 9,819,343 B2 | 11/2017 | Koehne et al. |
| 2009/0190369 A1 | 7/2009 | Elwell |
| 2011/0001146 A1* | 1/2011 | Yamazaki ........... H01L 51/5246 257/E33.001 |
| 2012/0251038 A1* | 10/2012 | Nagafuji ............. G02B 6/4231 29/838 |
| 2014/0237817 A1* | 8/2014 | Trajkovska-Broach .................... G02F 1/133788 29/842 |
| 2015/0323149 A1 | 11/2015 | Salter et al. |
| 2016/0237565 A1* | 8/2016 | Sieber ................ C23C 16/4412 |
| 2017/0267179 A1 | 9/2017 | Herrmann et al. |
| 2017/0345767 A1* | 11/2017 | Watanabe ......... H01L 23/49866 |
| 2018/0040393 A1* | 2/2018 | Fujino ................ C23C 14/3457 |
| 2018/0175100 A1* | 6/2018 | Hosokawa ............. H01L 24/02 |
| 2018/0229648 A1 | 8/2018 | Meier et al. |

FOREIGN PATENT DOCUMENTS

| | | |
|---|---|---|
| EP | 0969245 A2 | 1/2000 |
| WO | WO 2017/092844 A1 | 6/2017 |

* cited by examiner

POLYMERIC SUBSTRATE AND A METHOD OF PROVIDING SAME

CROSS-REFERENCE TO RELATED APPLICATIONS

This application is a continuation-in-part of U.S. patent application Ser. No. 16/439,674, filed Oct. 11, 2019, which is a continuation of U.S. patent application Ser. No. 16/378,553, filed Apr. 8, 2019, which is a continuation of U.S. patent application Ser. No. 16/378,533, filed Apr. 8, 2019, which claims the benefit of priority to U.S. Provisional Patent Application No. 62/642,010, filed Mar. 13, 2018, each of which is hereby incorporated by reference in its entirety for all purposes.

BACKGROUND

1. Field of the Invention

The present disclosure relates to a polymeric substrate where on at least one first surface of the polymeric substrate a protection system may be provided. On the protection system, a spectrally controlling system with an external surface may be applied. The spectrally controlling system may include multiple layers, one of the multiple layers may be a light absorbing or a light reflecting layer. The polymeric substrate may be used for a vehicular component.

The present disclosure relates further to a method of providing the polymeric substrate.

A metallic appearance of decorative parts of vehicles is often desired to emphasize the shape and value of the vehicle. Those parts can be backlighting, as for example in the instrument panel, the door panel, the door threshold and other parts.

2. Related Art

In the state of the art, it is known to provide metallic and backlit decorative parts, which can be found on dashboards, door panels, door thresholds. In the state of the art, when one wishes to have two backlit logos, through a metallized decorative part, one places a film constituting a mask with the corresponding pattern under the decorative part, and a light source under this film, with a corresponding joint, a light diffusion system, a supporting structure, the metallized part being permeable to light. The disadvantages of this principle are that the logos are not visible during the day, and that a multi-color look cannot be achieved with a single light source.

Coatings for automotive parts are known from WO 2011075796 A1 and WO 2015/131223, also with a partially removed spectrally controlling system. The principles of depositing a substance on a part with a 3D shape or a rough surface are known from FR 3033506/US 2018056671A1, FR3056123, FR3061676/WO2018130458A1, FR3058916, FR3062595/WO2018146240A1. A polymeric substrate coated with a reflective coating such as a chromium-based reflective coating is described in WO 2018/167096.

SUMMARY

In an aspect, a method of providing a polymeric substrate includes providing a protection system of one or more layers on at least one first surface of the polymeric substrate, coating a spectrally controlling system on a surface of the protection system to provide an external surface, the spectrally controlling system comprising at least a light absorbing or a light reflecting layer, partially removing the spectrally controlling system from the external surface until reaching the at least one first surface of the protection system creating in the spectrally controlling system an area free of the light absorbing or light reflecting layer of the spectrally controlling system, and covering the area by depositing at least one or more substances in droplets.

The kind and nature of droplets suitable is described in FR 3 033 506, also published as US 2018-0056671 A1 and in FR 3 058 916 and FR 3 062 595. The suitable volume of the droplets can be between 8 and 48 picolitres.

With such a method it is possible to create on a decorative part an apparent pattern/logo day and night with the possibility of having a multi-colored backlighting effect with only one light source through these decorative parts, since one decorative part can have multiple areas and the substances of each area can be different in color from each other.

Although in WO 2015/131223 A1 illuminated patterns with a "hidden 'til lit'" functionality due to a removed spectrally controlling system are described, there is no description of maintaining the SiO2 layer intact and about how to cover the area of the removed layer.

Preferably, the one or more layers of the protection system can include an abrasion resistant coating such as a thermal hardcoat and/or a stress resistant coating such as a SiO2 layer. Those layers of a protective system are state of the art.

To enable the backlighting effect the polymeric substrate, the protection system and the spectrally controlling system can be at least in part permeable to light originating from at least one second surface of the substrate, preferably by a light source.

To provide a metallic appearance, the light absorbing layer of the spectrally controlling system can include a chromium-based reflective coating.

It has turned out that the spectrally controlling system can be a multilayer PVD coating using magnetron sputtering incorporating chrome, followed by PE-CVD of examethyldisiloxane (HMDSO). This allows an excellent appearance.

To protect the polymeric substrate the protection system can include a thermal hardcoat made of thermally cured silicone. Further, the protection system such as the thermal hardcoat can be applied by dip coating to the polymeric substrate.

Further, the removal of the spectrally controlling system can be up to a depth of the area compared to the surface of not more than 220 nm. Preferably, the depth is at least 20 nm. The depth depends on the thickness of the spectrally controlling system and especially of the light absorbing or light reflecting layer.

To create sufficiently fine structures, the spectrally controlling system may be partially removed from the thermal hardcoat by laser etching with a laser. With a laser, the place of etching and the scope of etching can be adjusted sufficiently precise to keep the protection system with one or more layers intact.

Preferably, the deposition is a printing with a device for at least one or more substances in droplets. Since the size of the droplets is usually small enough to fit in the area, a very precise deposition can be provided.

For this purpose, the droplets can have a volume of less than 50 picolitres and preferably at least 5 picolitres.

The device for depositing at least one or more substances in droplets can include a jet, this allows to speed up the deposition.

The one or more substances can be selected from a paint, an ink or a varnish, as is needed in the specific application situation.

Further, a layer of a varnish can be applied to the surface of the spectrally controlling system to enhance the protection or the appearance.

Preferably, the polymeric substrate has at least partially a 3D geometry with two principal curvatures at a given point of the surface and the area is located at least partially at such a 3D geometry of the polymeric substrate.

The deposition of the droplets can be effected with a 6 axis robot holding the polymeric substrate and moving the same in a desired orientation to the jet, as it is described by FR 3 033 506.

In another aspect, a polymeric substrate includes at least one first surface including a protection system of one or more layers, a spectrally controlling system coated on the at least one first surface of the protection system to provide an external surface, the spectrally controlling system including at least a light absorbing or light reflecting layer, wherein the spectrally controlling system is partially removed from the external surface until reaching the at least one first surface of the protection system creating in the spectrally controlling system an area free of the light absorbing layer of the spectrally controlling system, and the area is covered by at least one or more substances deposited in droplets.

The spectrally controlling system may be partially removed from the external surface until reaching the protection system leaving in the spectrally controlling system an area free of the light absorbing or light reflecting layer of the spectrally controlling system. The area is covered by at least one or more substances deposited in droplets.

Such a polymeric substrate can be used to provide on a decorative part an apparent pattern/logo day and night with the possibility of having a multi-colored backlighting effect with only one light source through this decorative part, since one decorative part can have multiple areas and the substances of each area can be different in color from each other.

Preferably, one or more layers of the protection system can include an abrasion resistant coating such as a thermal hardcoat and/or a stress resistant coating such as a SiO2 layer.

If the one or more substances to cover the area is the same as the material of the polymeric substrate, a decorative part can be provided having the external surface of the spectrally controlling system and that of the substances to cover the area. Especially in the case, when the spectrally controlling system does not cover all the polymeric substrate, an appearance of an embedded spectrally controlling system can be reached.

A light effect can be provided, if the polymeric substrate, the protection system and the spectrally controlling system are at least in part permeable to light originating from at least one second surface of the substrate.

If the one or more substances to cover the area is least in part permeable to light, depending on the attenuation of the substance and of the color of the substance, a light effect compared to the surrounding can be obtained once the light source is switched on and the ambient light is dark enough.

If, on the other hand, the one or more substances to cover the area is impermeable to light, another optical effect can be achieved.

The one or more substances covering the area can close flush with the external surface surrounding of the area. This allows a smooth surface with all advantages for cleaning the surface and leads to a pleasant touch due to the impression of high quality.

The thickness of the spectrally controlling system and the protection system can be together between 2 μm and 10 μm, preferably between 3 μm and 6 μm.

The spectrally controlling system can be a four layer PVD coating, such as described by WO 2011/075796.

The polymeric substrate can be provided with a varnish covering the spectrally controlling system and the areas filled with the substance. This is a supplemental protection.

The polymeric substrate can have the function of a lens with light passing through from the inner to the outer surface and vice versa. The function of a lens is understood as changing the optical light path of light traversing the substrate. For example, light can leave the substrate in more homogeneous directions than the light enters the substrate.

The polymeric substrate can have the function of a part with hidden till lit effect with light passing through from the inner to the outer surface only and light from the outer surface is reflected.

Preferably, the depth of the area compared to the surface may be not more than 220 nm and preferably at least 20 nm. The droplets can have a volume of less than 50 picolitres and of at least 5 picolitres at the moment of its deposition.

Further, the polymeric substrate can have at least partially a 3D geometry with two principal curvatures at a given point of the surface and the area can be located at least partially in the 3D geometry of the surface.

The polymeric substrate can be part of an assembly together with a rear part to build one of a dashboard, a door panel, a console, so called a, b or c pillars of the body of a vehicle, a roof, an exterior element of a vehicle or a lamp assembly.

BRIEF DESCRIPTION OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

Figure 1:
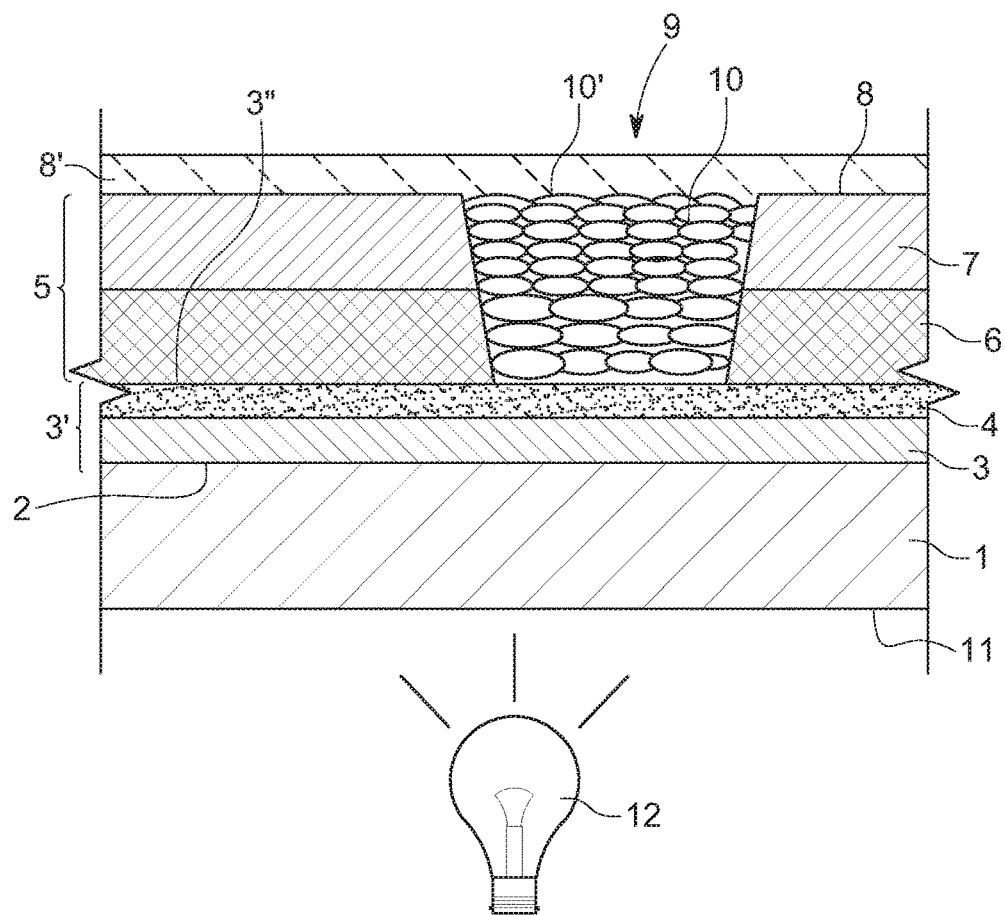
FIG. 1 is an example of a section of a part of polymeric substrate with an area covered by at least one or more substances deposited in droplets.

FIG. 1 shows a polymeric substrate 1 used for a lamp assembly configured to be mounted to a vehicle or for a lighting module for a vehicular bumper or for a vehicular component. On the first surface 2 of the polymeric substrate 1, a protection system 3' of one or more layers 3, 4 is provided. The protection system 3' may include an abrasion resistant coating 3 such as a thermal hardcoat and/or a stress resistant coating 4 such as SiO2. A surface 3" of the protection system 3' is coated with a spectrally controlling system 5 including multiple layers 6, 7 and providing an external surface 8.

One of the multiple layers of the protection system 3' is a SiO2 layer 5, covering the thermal hardcoat 4. Further, the polymeric substrate 1 and its spectrally controlling system 5 can be covered with a varnish 8', represented in dotted lines, which is permeable to light to show the first surface 8 if looked at from that side.

Another layer of the multiple layers 6, 7 is a light absorbing or light reflective layer 7. This light absorbing or light reflective layer 7 can be a chrome layer applied in a PVD coating process. Such a polymeric substrate 1 and a protection system 3' with hardcoat is known from WO 2018/167096A1, as well as the use of reflective coatings.

According to the present disclosure the spectrally controlling system 5 is partially removed from the external surface 8 to a depth until reaching the surface of the protection system. Removing the material of the spectrally controlling system 5 creates an area 9 free of the light absorbing or light reflective layer 7 of the spectrally controlling system 5.

The area 9 is covered by at least one or more substances 10 deposited in droplets 10'.

In case the polymeric substrate 1 is part of a light system or a light assembly, a light source 12 is provided and located at a second surface 11 of the polymeric substrate 1 radiating electromagnetic waves towards the polymeric substrate 1.

Figure 2:
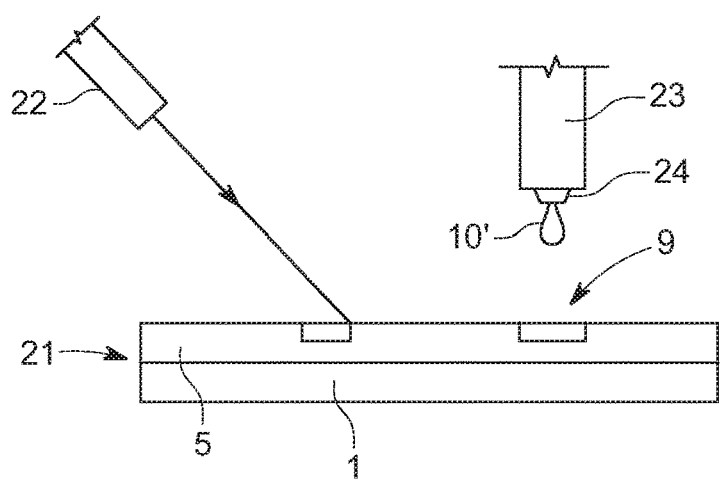
FIG. 2 is an example of the polymeric substrate in an arrangement for laser etching and deposition of a substance in droplets.

In FIG. 2 the polymeric substrate 1 with its coating and its spectrally controlling system 5 as part of the coating is placed in an arrangement for laser etching with a laser 22 and for depositing a substance 10 in droplets 10' with a deposition device 23. The device 23 for depositing at least one or more substances 10 in droplets 10' includes a jet 24.

When the laser etching of the spectrally controlling system 5 takes place, the light absorbing or light reflective layer 7 such as the chrome layer may be removed, and the protection system 3' (FIG. 1) with for example the thermal hardcoat 4 (FIG. 1) may stay intact on the polymeric substrate 1, keeping the material of the polymeric substrate protected from scratch and weathering.

Then, depositing a substance 10 in droplets 10' takes place with the deposition device 23. To have a precise depositing of the substance 10 in the free area 9 obtained by laser etching, a robot with 6 axes can be used. The basic principles of this technique are described in FR3033506/ US2018056671A1, FR3056123, FR3061676/ WO2018130458A1, FR3058916, FR3062595/ WO2018146240A1.

According to various aspect of the present disclosure, one example advantage is the ability to remove and apply material on a polymeric substrate 1 with a 3D geometry with two principal curvatures (see FIG. 7a, b) at a given area 9 of the coating on the surface 2. The area 9 is located at least partially in the 3D geometry of the surface.

The polymeric substrate 1 can be scanned with a scan head (not shown) after the laser etching to obtain the precise position and/or shape of the free area 9 to be filled with the deposition device 23. In another setup, the digital data of the laser 22 used for the laser etching can be used directly for the positioning of the deposition device 23.

In case of less complicated geometries of polymeric substrates, methods of 2D printing can be used.

Figure 3:
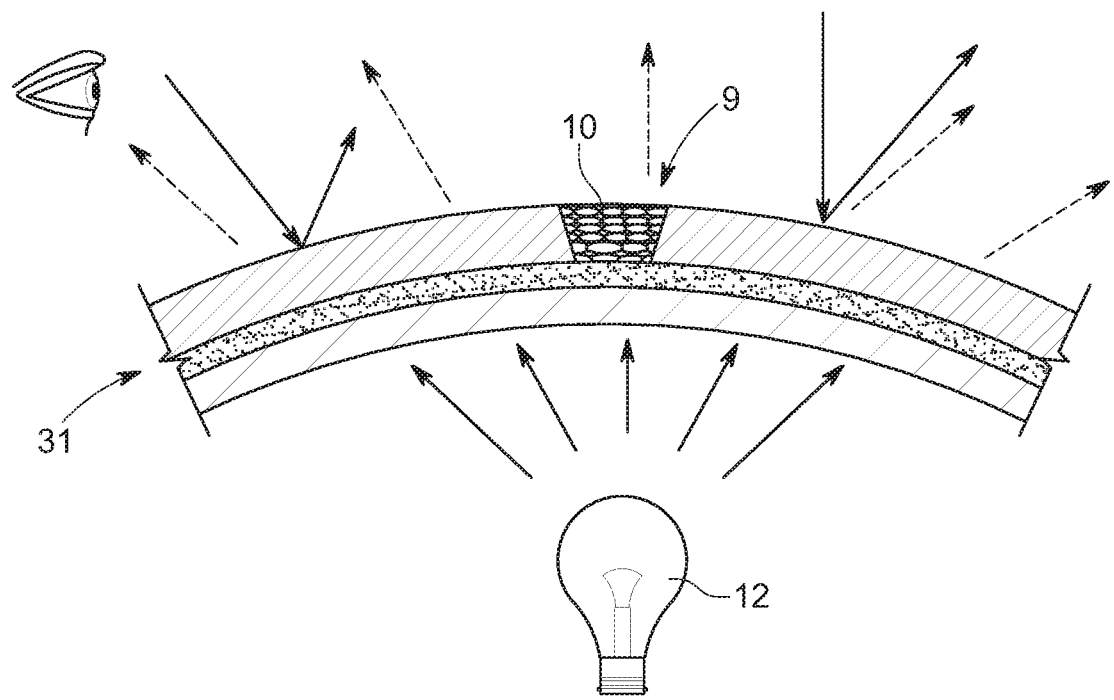
FIG. 3 is an example of a polymeric substrate permeable to light at the covered area.

In FIG. 3, the polymeric substrate 31 is permeable to light originating from a light source 12, indicated by the arrows next to the light source 12 and passing through the polymeric substrate 31 and the respective layers, indicated by the arrows in dotted lines to show the attenuation or the change of the light. In this embodiment, the area 9 covered by the substance 10 is permeable to light as well, although the transmissivity can differ from the surrounding of the area 9.

Further, the spectrally controlling system 5 (FIG. 1) on the polymeric substrate 31 can include a light reflecting layer as shown by the arrows in full lines. Without illumination by the light source 12, there could be provided a metallic appearance.

It might be appropriate in some cases that the substance 10 in the area 9 is the same as the material of the polymeric substrate 1, 31.

Figure 4:
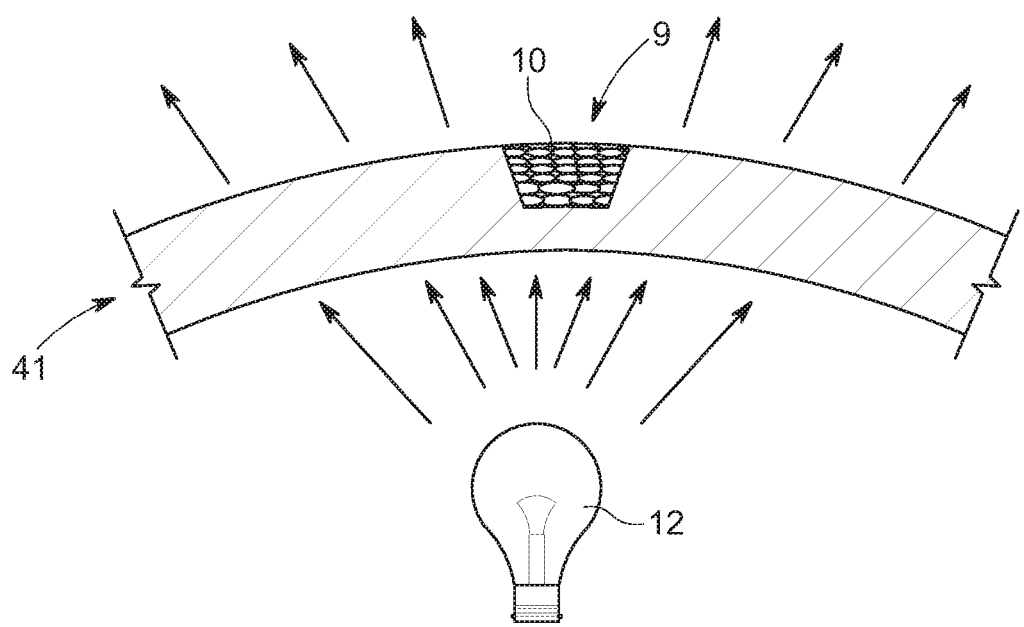
FIG. 4 is an example of a polymeric substrate impermeable to light at the covered area.

In FIG. 4 a polymeric substrate 41 is impermeable to light at the covered area 9, indicated by the missing arrows in that region compared to the surrounding polymeric substrate 41. For sake of clarity the different layers as set out in FIG. 1 are not shown.

It might be appropriate in some cases that the substance 10 in the area 9 is the same as the material of the polymeric substrate 1, 31, 41. Even if the polymeric substrate 1 is impermeable to light, there can be a desired aesthetic effect by changing between the surface 8 of the spectrally controlling system and the substance 10 in the area 9.

Figure 5:
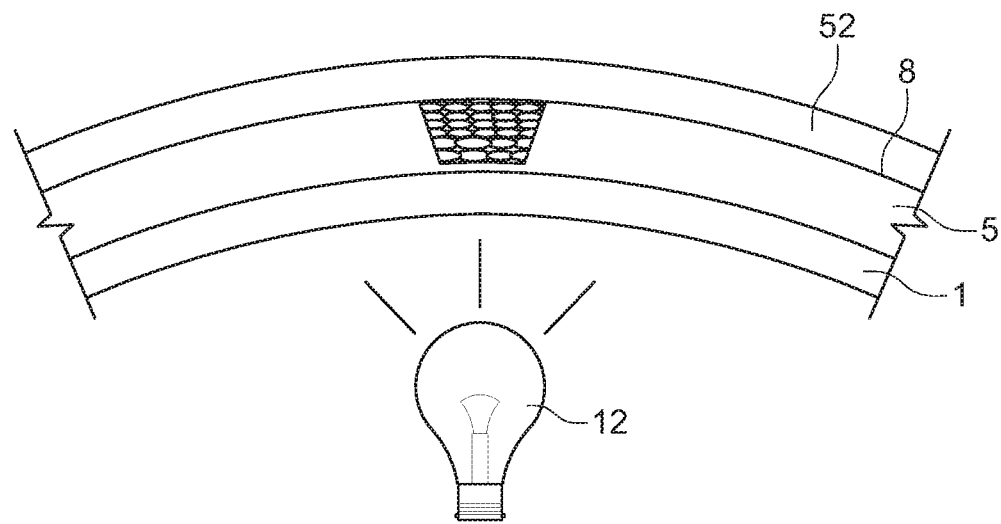
FIG. 5 is an example of a polymeric substrate covered with a varnish.

As shown in FIG. 5, the polymeric substrate 1 and its spectrally controlling system 4 can be covered with a varnish 52, which is permeable to light to show the first surface 8.

Figure 6:
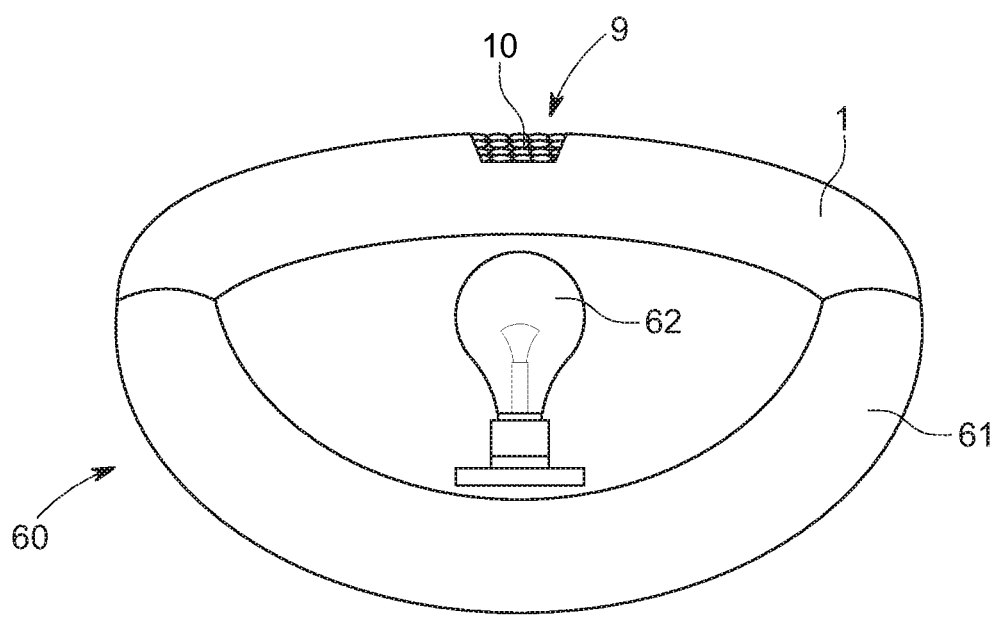
FIG. 6 is an example of a polymeric substrate as part of an assembly with a back.

In FIG. 6 an assembly 60 including the polymeric substrate 1 and a back 61 is shown, including a lamp 62 in those cases when a light effect is desired.

Figure 7A:
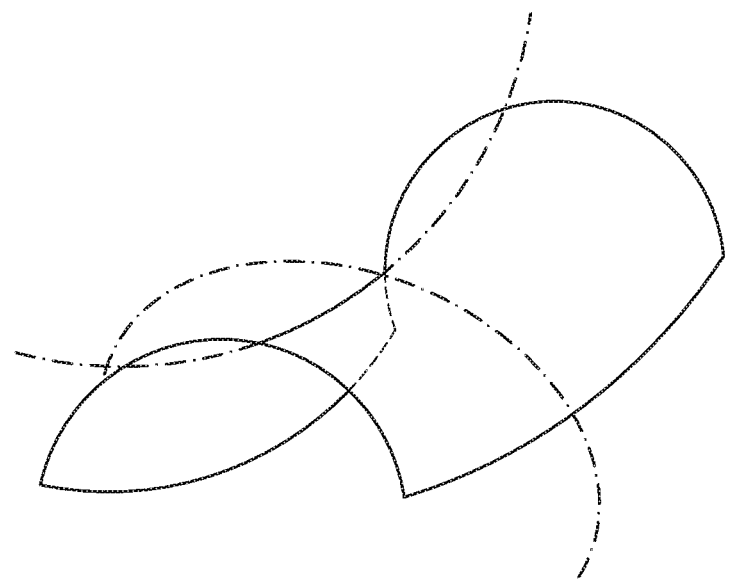
FIGS. 7A and 7B are two examples of a 3D form with two principal curvatures, a saddle and a sphere.
Figure 7B:
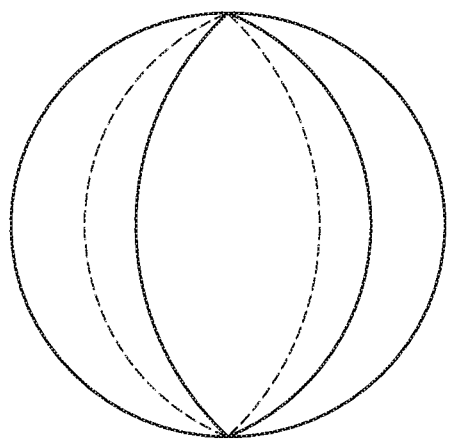

FIG. 7A, B show a 3D geometry in form of a saddle (FIG. 7A) and of a sphere (FIG. 7B) to explain a substrate with a 3D geometry compared to a flat substrate with a 2D geometry. The 2D geometry, for example, a piece of paper on a table, has a curvature of zero in each direction. The substrate with a 3D geometry has two principal curvatures at a given point of the surface, at least the curvature in one direction is different from zero, for example on a cylinder surface, and a sphere or a saddle have two curvatures different from zero.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

LIST OF REFERENCE SIGNS 1 polymeric substrate
2 first surface
3 hardcoat
4 spectrally controlling system
5 SiO2 layer
6 other layer of the multiple layers 5-7
7 light absorbing layer
8 external surface
8' varnish
9 area
10 substances
10' droplets
11 second surface
12 light source
22 laser
23 deposition device
24 jet
31 polymeric substrate
41 polymeric substrate
52 varnish
60 assembly
61 back
62 lamp

What is claimed is:

1. A method of providing a polymeric substrate, comprising
   providing a protection system of one or more layers on at least one first surface of the polymeric substrate;
   coating a spectrally controlling system having a first transmissivity on a surface of the protection system to provide an external surface, the spectrally controlling system comprising at least a light absorbing or a light reflecting layer;
   partially removing the spectrally controlling system from the external surface until reaching the surface of the protection system creating in the spectrally controlling system an area free of the light absorbing or light reflecting layer of the spectrally controlling system; and
   filling the area by depositing at least one or more substances in droplets having a second transmissivity of 0% or greater, the second transmissivity differing from the first transmissivity, the external surface comprising a surface of the droplets.

2. The method according to claim 1, wherein the one or more layers of the protection system comprises an abrasion resistant coating including at least one of a thermal hardcoat, a stress resistant coating, and a $SiO_2$ layer.

3. The method according to claim 1, wherein the polymeric substrate, the protection system, and the spectrally controlling system are at least in part permeable to light originating from at least one second side of the substrate.

4. The method according to claim 1, wherein the light absorbing layer of the spectrally controlling system comprises a chromium-based reflective coating.

5. The method according to claim 1, wherein the spectrally controlling system is a multilayer physical vapor deposition (PVD) coating using magnetron sputtering incorporating chrome followed by plasma enhanced chemical vapor deposition PE-CVD) of hexamethyldisiloxane (HMDSO).

6. The method according to claim 2, wherein the thermal hardcoat of the protection system is of thermally cured silicone.

7. The method according to claim 1, wherein the protection system is applied by dip coating to the polymeric substrate.

8. The method according to claim 1, wherein the removal of the spectrally controlling system is at a depth of the area compared to the external surface of not more than 220 nm and at least 20 nm.

9. The method according to claim 1, wherein the spectrally controlling system is partially removed from the protection system by laser etching with a laser.

10. The method according to claim 1, wherein the depositing is a printing with a device for at least one or more substances in droplets.

11. The method according to claim 10, wherein the droplets have a volume of less than 50 picolitres and at least 5 picolitres.

12. The method according to claim 10, wherein the device for depositing at least one or more substances in droplets comprises a jet.

13. The method according to claim 10, wherein the one or more substances is at least one of a paint, an ink, or a varnish.

14. The method according to claim 1, further comprising applying a layer of a varnish to a surface of the spectrally controlling system.

15. The method according to claim 14, wherein the at least one first surface of the polymeric substrate has at least partially a 3D geometry and the area is located at least partially at such a 3D geometry of the polymeric substrate.

* * * * *